United States Patent Office 3,544,821
Patented Dec. 1, 1970

3,544,821
HIGH-POWER TURBOGENERATOR WITH DIRECTLY COOLED STATOR WINDING AND LEADS

Günter Garnitschnig, Birr, Hans Herrmann, Baden, and Hans Wälchli, Nussbaumen, Switzerland, assignors to Aktiengesellschaft Brown, Boveri & Cie., Baden, Switzerland, a joint-stock company
Filed Aug. 4, 1969, Ser. No. 847,035
Claims priority, application Switzerland, Aug. 15, 1968, 12,299/68
Int. Cl. H02k 9/19
U.S. Cl. 310—54                                3 Claims

ABSTRACT OF THE DISCLOSURE

A flexible electrical and hydraulic connection between the hollow leads of a hollow stator winding of a high-power turbogenerator and corresponding terminal bushings in the stator casing through which a fluid coolant is passed comprises a plurality of spirally-shaped electrically conductive pipes arranged electrically and hydraulically in parallel. Distribution headers are located at the lead and bushing ends of the pipes and the coolant passes through adjacent pipes in opposite directions so as to avoid creation of a magnetic field that could produce leakage fluxes in the region of the terminal box.

---

With turbogenerators for high power it is known that the terminal bushings of the machine should not be mechanically stressed due to movements of the ingoing or outgoing leads within the machine which are caused by thermal effects. In machines provided with hydrogen gas cooling it is usual to connect the outgoing leads to the terminals by means of flexible stranded conductors, whereby the use of such flexible connections is only possible up to a certain value of the terminal current. For machines with a high current or for turbogenerators having a liquid-cooled stator and rotor winding, a form of cooling that is required to an increasing extent in order to increase the output of the machine, it is impossible to use a flexible connection of the aforementioned kind.

The object of the invention is to provide for a high-power turbogenerator with directly cooled stator winding and leads, a suitable flexible connection between the leads and the terminal bushings which keeps the temperature-dependent movements of the leads away from the bushings. In accordance with the invention this is achieved by providing a flexible connection, consisting of a plurality of spiral parallel-connected electrically conductive pipe sections, between the hollow leads of the stator winding and the corresponding terminal bushings on the stator casing.

Figure 1:
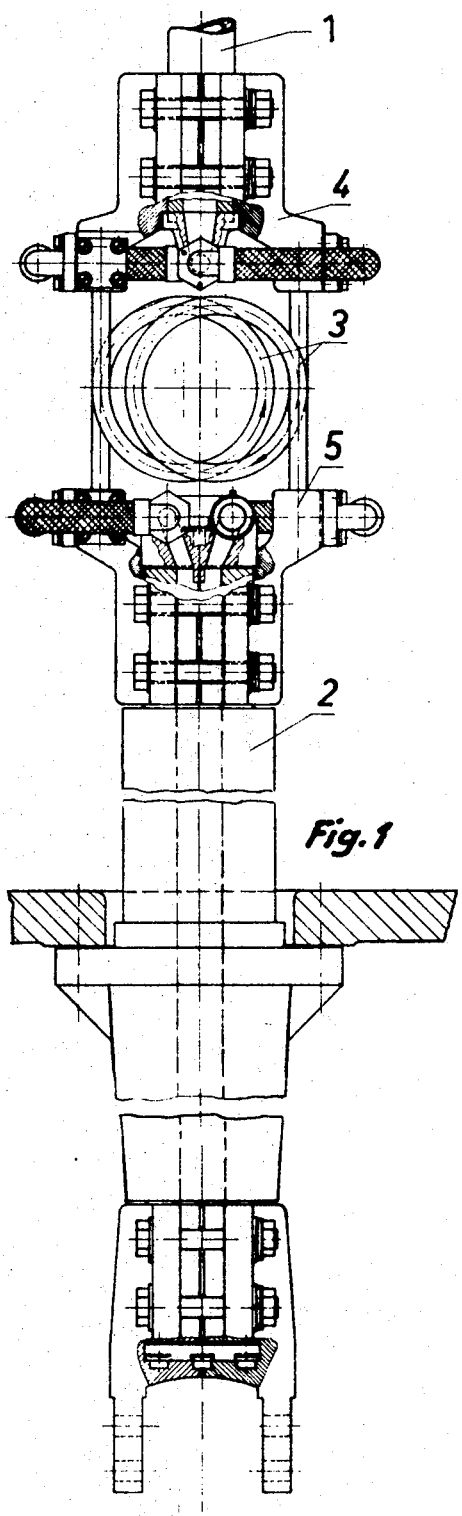
Figure 2:
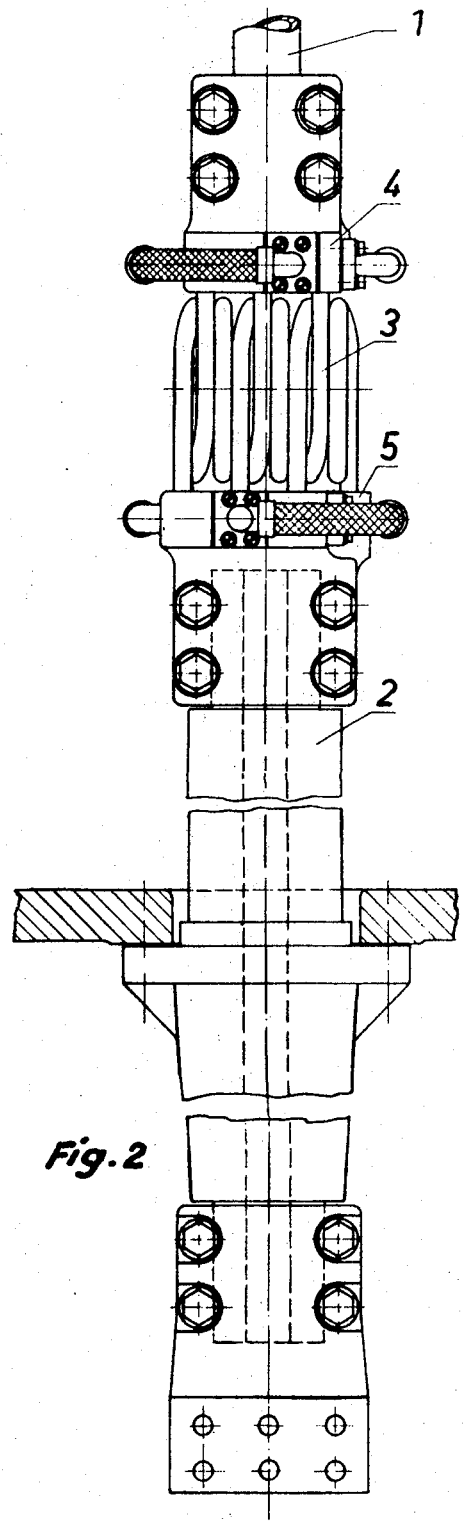

A constructional example of the invention is now explained by means of the accompanying drawing where FIGS. 1 and 2 show a flexible connection for a lead of the stator winding of a turbogenerator in front view (partly in section) and lateral view respectively.

In the figures, reference number 1 indicates the electrical lead which consists of a hollow conductor that is for instance directly cooled with water and is connected to a water-cooled stator winding not shown in the drawing, whilst 2 is the bushing terminal for the lead. The flexible connection between lead 1 and terminal bushing 2 is achieved by means of a plurality of electrically conductive spirally shaped pipes 3 which are connected in parallel. These pipes are connected on the one hand to a common header 4 in communication with the lead 1 and on the other hand to a common header 5 connected to the terminal bushing 2, whereby these headers are so constructed that they also serve as distribution chambers for the cooling water. The flexible pipes 3 are connected and arranged in such a manner that the flow of the cooling water is oppositely directed in adjacent pipes as indicated by the arrows in FIG. 1, so that no resultant magnetic field is induced which could produce leakage fluxes in the region of the terminal box.

Although in the constructional example described, direct cooling with water is provided, it is also possible to use a different cooling medium.

We claim:

1. In a high-power generator including a hollow stator winding and hollow leads thereto through which a fluid coolant is circulated, the improvement which resides in a flexible electrical connection provided between said hollow leads and the corresponding terminal bushings in the stator casing, said flexible connection comprising a plurality of spirally shaped electrically conductive pipes arranged electrically and hydraulically in parallel and through which the fluid coolant and current passes.

2. The invention as defined in claim 1 wherein said flexible pipe connection includes a common header arranged at the opposite ends of said pipes, one said header being joined to said lead and the other header to said terminal bushing, said headers being structured to serve as distribution chambers for the fluid coolant flowing through said pipes.

3. The invention as defined in claim 2 wherein said pipes are so arranged and connected that the flow of the fluid coolant is oppositely directed in adjacent pipes.

References Cited

UNITED STATES PATENTS

| | | | |
|---|---|---|---|
| 1,793,434 | 2/1931 | Blathy | 310—54 |
| 2,897,382 | 7/1959 | Hamill | 310—64 |
| 3,322,985 | 5/1967 | Azbukin et al. | 310—61 |
| 3,353,040 | 11/1967 | Abbott | 310—27 |

FOREIGN PATENTS

| | | | |
|---|---|---|---|
| 1,071,217 | 12/1959 | Germany | 310—64 |
| 1,140,639 | 12/1962 | Germany | 310—64 |

DONOVAN F. DUGGAN, Primary Examiner

U.S. Cl. X.R.

310—64